United States Patent
Jang et al.

(10) Patent No.: US 12,248,868 B2
(45) Date of Patent: Mar. 11, 2025

(54) NEURAL PROCESSING DEVICE AND OPERATION METHOD OF THE NEURAL PROCESSING DEVICE

(71) Applicant: Samsung Electronics Co., Ltd., Suwon-si (KR)

(72) Inventors: Jun-Woo Jang, Suwon-si (KR); Jinook Song, Seongnam-si (KR); Sehwan Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 17/376,516

(22) Filed: Jul. 15, 2021

(65) Prior Publication Data
US 2022/0284274 A1 Sep. 8, 2022

(30) Foreign Application Priority Data
Mar. 3, 2021 (KR) .......................... 10-2021-0028311

(51) Int. Cl.
*G06N 3/06* (2006.01)
*G06N 3/04* (2023.01)
*G06N 3/063* (2023.01)

(52) U.S. Cl.
CPC .............. *G06N 3/063* (2013.01); *G06N 3/04* (2013.01)

(58) Field of Classification Search
None
See application file for complete search history.

(56) References Cited

U.S. PATENT DOCUMENTS 9,971,540 B2   5/2018  Herrero Abellanas et al.
2005/0128951 A1* 6/2005  Chawla ................. H04L 47/803
                                                370/235

(Continued)

FOREIGN PATENT DOCUMENTS

CN   109976903 A   7/2019
JP   2018-116469 A  7/2018

(Continued)

OTHER PUBLICATIONS

Chen, et al. "Eyeriss: A spatial architecture for energy-efficient dataflow for convolutional neural networks." *ACM SIGARCH Computer Architecture News* 44.3 (Jun. 2016): 367-379. (4 pages in English).

(Continued)

*Primary Examiner* — Tracy C Chan
(74) *Attorney, Agent, or Firm* — NSIP Law

(57) ABSTRACT

A neural processing device includes a first memory configured to store universal data, a second memory distinguished from the first memory and having a capacity less than that of the first memory, a bandwidth control path configured to reconfigure a memory bandwidth for memory clients to use one of the first memory and the second memory based on a control signal, and a control logic configured to calculate a target capacity for data of a target client of the memory clients determined based on a layer configuration of an artificial neural network, and generate the control signal to store the data of the target client in the second memory based on a result of comparing the target capacity and the capacity of the second memory.

28 Claims, 14 Drawing Sheets

(56) References Cited

U.S. PATENT DOCUMENTS

| | | | | |
|---|---|---|---|---|
| 2012/0041914 A1* | 2/2012 | Tirunagari | ............ | G06F 12/121 706/15 |
| 2019/0378016 A1* | 12/2019 | John | ........................ | G06N 3/04 |
| 2020/0104256 A1* | 4/2020 | Xu | ........................ | G06F 12/0284 |
| 2021/0072901 A1* | 3/2021 | Kale | ........................ | G06N 3/045 |

FOREIGN PATENT DOCUMENTS

| | | | |
|---|---|---|---|
| KR | 10-2018-0084289 A | 7/2018 | |
| KR | 10-2020-0052417 A | 5/2020 | |

OTHER PUBLICATIONS

Parashar, et al. "Scnn: An accelerator for compressed-sparse convolutional neural networks." *ACM SIGARCH Computer Architecture News* 45.2 (May 23, 2017): 27-40. (12 pages in English).

\* cited by examiner

NEURAL PROCESSING DEVICE AND OPERATION METHOD OF THE NEURAL PROCESSING DEVICE

CROSS-REFERENCE TO RELATED APPLICATIONS

This application claims the benefit under 35 USC § 119(a) of Korean Patent Application No. 10-2021-0028311 filed on Mar. 3, 2021, in the Korean Intellectual Property Office, the entire disclosure of which is incorporated herein by reference for all purposes.

BACKGROUND

1. Field

The following description relates to a neural processing device and an operation method of the neural processing device.

2. Description of Related Art

For a neural processing unit (NPU), a single integrated memory may be used. In such a case, the number of memory clients may increase when the number of operators sharing the memory increases. Thus, an incidence of a memory bank conflict may increase, compromising the performance of the NPU. However, increasing the number of memory banks to prevent such a collision between the memory banks may increase power and/or memory area overhead. In addition, fixing the memory size of a memory bank may result in limited and ineffective memory usage and generation of the area overhead. Thus, there is a desire for a memory operating method that may prevent a memory bank collision while effectively using a memory.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a neural processing device includes a first memory configured to store universal data, a second memory distinguished from the first memory and having a capacity less than that of the first memory, a bandwidth control path configured to reconfigure a memory bandwidth for memory clients to use one of the first memory and the second memory based on a control signal, and a control logic configured to calculate a target capacity for data of a target client of the memory clients determined based on a layer configuration of an artificial neural network, and generate the control signal to store the data of the target client in the second memory based on a result of comparing the target capacity and the capacity of the second memory.

The control logic may be further configured to, in response to the target capacity being greater than the capacity of the second memory, generate the control signal to store the data of the target client in the first memory and decrease a bandwidth of the first memory for data of at least one remaining client of the memory clients from which the target client is excluded.

The control logic may be further configured to, in response to the target capacity being less than or equal to the capacity of the second memory, generate the control signal to store the data of the target client in the second memory and increase a bandwidth of the first memory for data of at least one remaining client of the memory clients from which the target client is excluded.

The control logic may be further configured to, in response to the capacity of the first memory being greater than a data capacity of the memory clients, generate the control signal to operate the bandwidth control path in a normal mode using the first memory for the data of the target client determined based on a layer type of the artificial neural network and the layer configuration.

The control logic may be further configured to, in response to the capacity of the first memory being less than or equal to a data capacity of the memory clients, generate the control signal to operate the bandwidth control path in a boost mode using the second memory for the data of the target client determined based on a layer type of the artificial neural network and the layer configuration.

When the artificial neural network includes a convolution layer and the target client is a first client of the memory clients associated with weight, the control logic may be further configured to store the weight in the second memory based on an input channel and kernel size of the convolution layer, and increase a bandwidth of the first memory for a third client of the memory clients associated with a partial sum or an output feature map.

When the artificial neural network includes a fully connected layer and the target client is a second client associated with a feature map, the control logic may be further configured to store data of the feature map in the second memory, and increase a bandwidth of the first memory for a first client of the memory clients associated with weight.

When the artificial neural network includes a convolution layer and the target client is a third client associated with a partial sum, the control logic may be further configured to store data of the partial sum in the second memory based on a size of a feature map of the convolution layer, and increase a bandwidth of the first memory for a first client of the memory clients associated with weight.

Each of the memory clients may be associated with any one of an input feature map, weight, and a partial sum or an output feature map.

The bandwidth control path may include twelve input ports including four first input ports for a first client of the memory clients associated with weight, four second input ports for a second client of the memory clients associated with an input feature map, and four third input ports for a third client of the memory clients associated with a partial sum, and nine output ports connected to the first memory.

The four first input ports may be connected to a 4-to-1 mux, three remaining first input ports of the four first input ports from which one first input port is excluded may be respectively connected to three third input ports for the third client and to three 2-to-1 muxes, and the four second input ports for the second client associated with the input feature map may be directly connected to four output ports of the nine output ports.

When a bandwidth of the first memory for the first client is limited, the control logic may be further configured to sequentially provide a select signal for the 4-to-1 mux connected to the four first input ports through a round-robin method.

When a bandwidth of the first memory for the first client increases, the control logic may be further configured to provide a select signal for the one first input port excluded from the connection to the three third input ports through the 2-to-1 muxes of the four first input ports.

In another general aspect, an operation method of a neural processing device includes a first memory and a second memory having a capacity less than that of the first memory. The operation method includes calculating a target capacity for data of a target client of memory clients determined based on a layer configuration of an artificial neural network, comparing the target capacity and the capacity of the second memory, determining a target memory from between the first memory and the second memory in which the data of the target client is to be stored based on a result of the comparing, and generating a control signal for a bandwidth control path to reconfigure a memory bandwidth for the memory clients to store the data of the target client in the target memory.

The determining of the target memory may include, in response to the target capacity being greater than the capacity of the second memory, determining the first memory to be the target memory. The generating of the control signal may include generating the control signal to store the data of the target client in the first memory and decrease a bandwidth of the first memory for data of at least one remaining client of the memory clients from which the target client is excluded.

The determining of the target memory may include, in response to the target capacity being less than or equal to the capacity of the second memory, determining the second memory to be the target memory. The generating of the control signal may include generating the control signal to store the data of the target client in the second memory and increase a bandwidth of the first memory for data of at least one remaining client of the memory clients from which the target client is excluded.

The operation method may further include comparing the capacity of the first memory and a data capacity of the memory clients. The generating of the control signal may include, in response to the capacity of the first memory being greater than the data capacity of the memory clients as the result of the comparing, generating the control signal to operate the bandwidth control path in a normal mode using the first memory for the data of the target client determined based on a layer type of the artificial neural network and the layer configuration.

The generating of the control signal may further include, in response to the capacity of the first memory being less than or equal to the data capacity of the memory clients, generating the control signal to operate the bandwidth control path in a boost mode using the second memory for the data of the target client determined based on the layer type and the layer configuration.

When the artificial neural network includes a convolution layer and the target client may be a first client associated with weight. The generating of the control signal may include storing the weight in the second memory based on an input channel and kernel size of the convolution layer, and increasing a bandwidth of the first memory for a third client of the memory clients associated with a partial sum or an output feature map.

When the artificial neural network includes a fully connected layer and the target client is a second client associated with a feature map, the generating of the control signal may include storing data of the feature map in the second memory, and increasing a bandwidth of the first memory for a first client of the memory clients associated with weight.

When the artificial neural network includes a convolution layer and the target client is a third client associated with a partial sum, the generating of the control signal may include storing data of the partial sum in the second memory based on a size of a feature map of the convolution layer, and increasing a bandwidth of the first memory for a first client of the memory clients associated with weight.

Each of the memory clients may be associated with any one of an input feature map, weight, and a partial sum or an output feature map.

A non-transitory computer-readable storage medium may store instructions that, when executed by a processor, cause the processor to perform the operation method above.

In another general aspect, a neural processing device includes a first memory bank, a second memory bank having a capacity less than a capacity of the first memory, a bandwidth control path configured to reconfigure a memory bandwidth for memory clients to use any one of the first memory bank and the second memory bank based on a control signal, and a control logic. The control logic is configured to calculate a target capacity for data of a target client of the memory clients determined based on a layer configuration of an artificial neural network, compare the target capacity and the capacity of the second memory bank, and, in response to the target capacity is less than or equal to the capacity of the second memory bank, generate the control signal to store the data of the target client in the second memory bank and increase a bandwidth of the first memory bank for data of at least one remaining client of the memory clients from which the target client is excluded.

The control logic may be further configured to, in response to the target capacity being greater than the capacity of the second memory bank, generate the control signal to store the data of the target client in the first memory bank and decrease a bandwidth of the first memory bank for data of at least one remaining client of the memory clients from which the target client is excluded.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
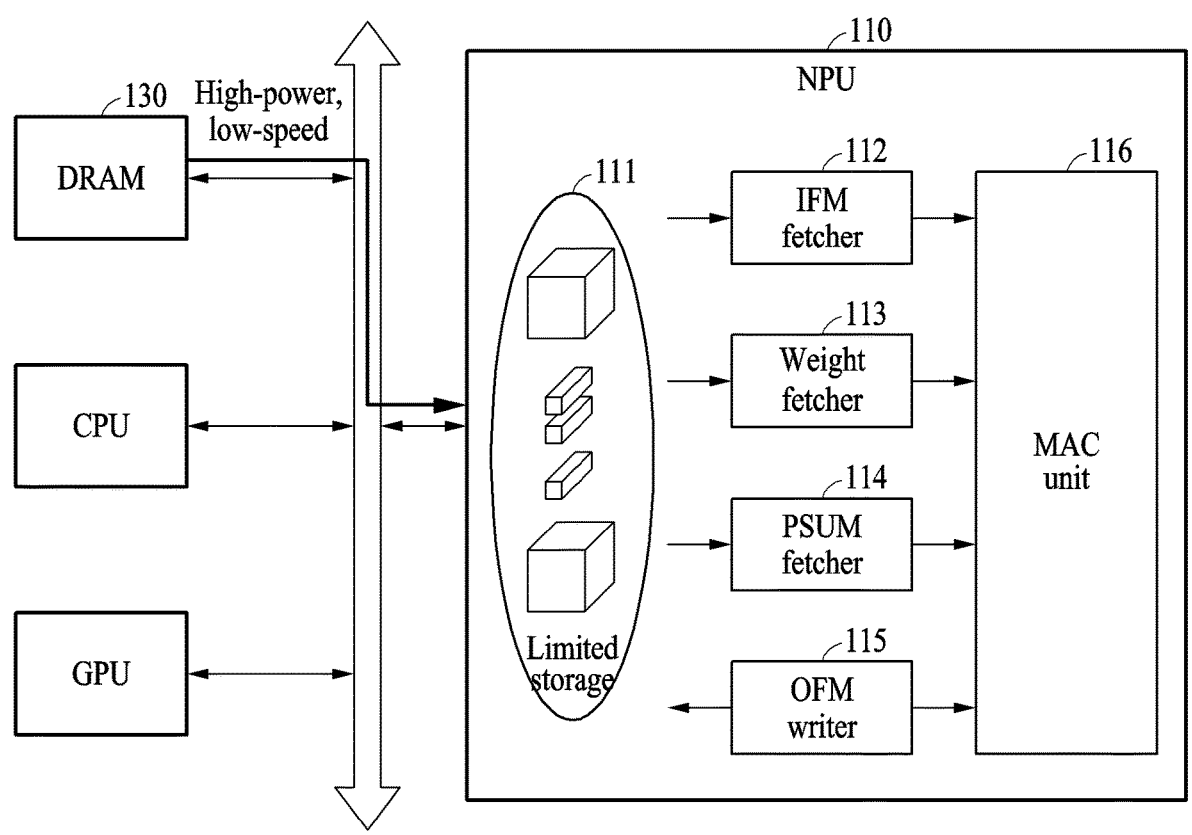
FIG. 1 illustrates an example of memory for a neural processing unit (NPU).

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of memory for a neural processing unit (NPU). Referring to FIG. 1, illustrated is an on-chip storage 111 for an NPU 110.

The NPU 110 may refer to an artificial intelligence (AI) processor that is connected to numerous neurons through synapses to exchange signals therebetween and configured to simultaneously process massive operations, and may be optimized for an AI algorithm operation. The NPU 110 may also be referred to as a neural network processing device or a neural processing device, and may learn and process information by itself using multiple layers of hardware nodes, i.e. neurons.

The NPU 110 may process multiple operations such as simultaneous matrix operations in real-time and derive an optimal value through self-learning based on accumulated data.

The NPU 110 may store, in the storage 111, which is an internal storage of the NPU 110, an input feature map (or indicated as IFM) and/or weight that is read from the storage 111 through an input feature map fetcher 112 and/or weight fetcher 113. The NPU 110 may temporarily store, in the storage 111, a result of a partial sum (or indicated as PSUM) generated during an operation through the PSUM fetcher 114. Alternatively, the NPU 110 may store an output feature map (or indicated as OFM) in the storage 111 and use it in a next layer through the OFM writer 115.

The NPU 110 may reuse internally stored information for an operation in a multiply-accumulate (MAC) unit 116. The internally stored information may include, for example, an input feature map, weight, a partial sum result, and an output feature map, but examples of which are not limited thereto.

The storage 111 may have a relatively higher processing speed than a dynamic random-access memory (DRAM) 130 with high power and a low processing speed. The storage 111 may have a capacity less than that of the DRAM 130. The storage 111 may be configured as, for example, a static random-access memory (SRAM) and/or a flash memory, but examples of which are not limited thereto.

Figure 2:
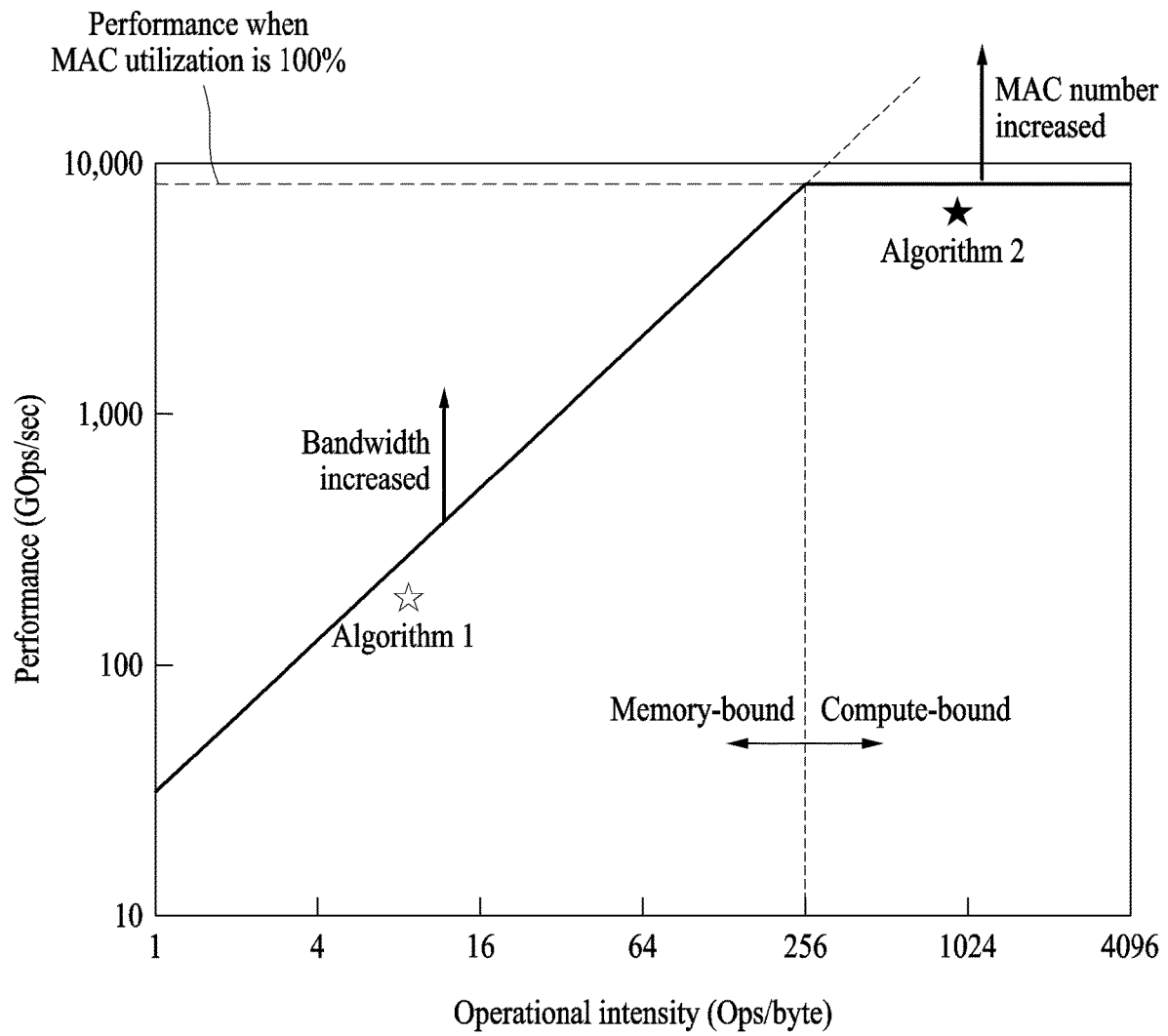
FIG. 2 illustrates an example of a roofline model.

FIG. 2 illustrates an example of a roofline model. FIG. 2 illustrates memory-bound algorithm 1 in a roofline model and processor-bound algorithm 2 in the roofline model.

The roofline model may refer to an intuitive visual performance model that is used to provide an estimated performance value of a predetermined computing kernel or an application program that is executed in such a structure as a multicore or an accelerator processor by exhibiting an intrinsic hardware constraint and a potential effect and priority of optimization. The roofline model may indicate a potential performance value that is reachable by optimization.

Referring to the roofline model illustrated in FIG. 2, it is observed that performance gradually increases as an operational intensity value gradually increases and then converges at some point. For example, in an area in which algorithm 1 is present, it is observed that efficiency increases as a memory bandwidth increases in a case of 100% MAC utilization. The efficiency of algorithm 1 may increase as the memory bandwidth increases, but no longer increase after a point at which the operational intensity value is 256 ops/byte even when the memory bandwidth increases. An operational intensity may be represented by operations per byte of DRAM traffic, and be used to determine the most suitable architecture for a given computing kernel or determine a method of optimizing the kernel.

The performance may increase as memory access decreases before algorithm 1 reaches the point at which the operational intensity value is 256 ops/byte, and the efficiency converges. As described above, in a case in which a time used to complete a given computation or calculation query is determined mainly by a memory amount needed to hold task data, such a case may be represented as being memory-bound.

In contrast, in an area in which algorithm 2 is present, it is observed that there is no increase in efficiency despite an increase in the memory bandwidth, and the performance of a processor itself may determine the efficiency. In the area in which algorithm 2 is present, the importance of access to a memory may be reduced, and thus the memory may no longer restrict the performance. For example, the efficiency may increase by increasing the number of MACs or increasing a MAC (calculation) speed. As described above, in a case in which a time used to complete a given computation or calculation query is determined mainly by the performance of the processor configured to perform a computation or calculation operation, such a case may be represented as being compute-bound or processor-bound.

Hereinafter, an operation of a neural processing device by which efficiency is memory-bound will be described in detail.

Figure 3:
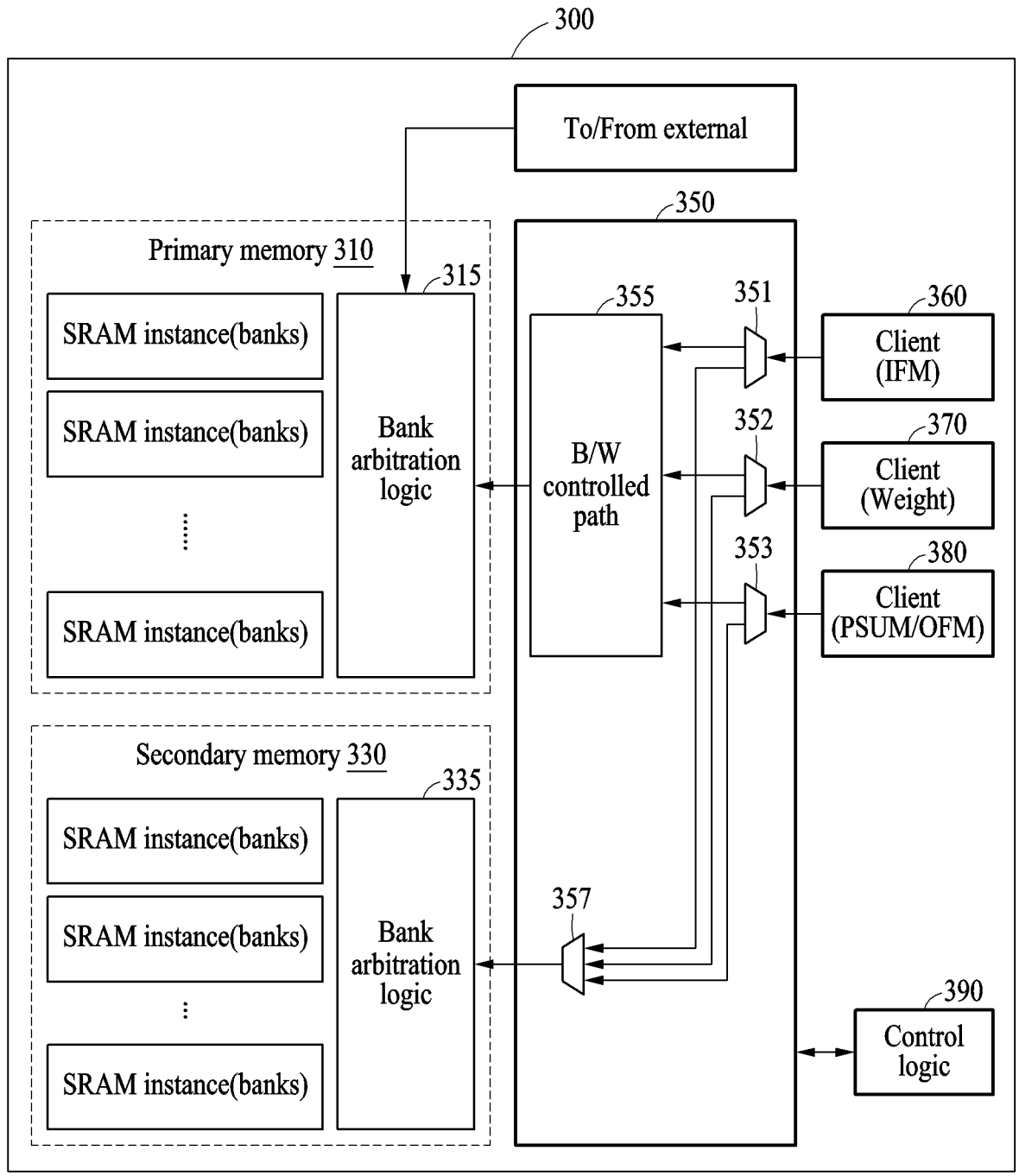
FIG. 3 illustrates an example of a neural processing device.

FIG. 3 illustrates an example of a neural processing device. Referring to FIG. 3, a neural processing device 300 includes a first memory 310, a second memory 330, a bandwidth control module 350, and a control logic 390.

The first memory 310 may store therein universal data. The first memory 310 may also be referred to as primary memory or a universal memory in that it stores all sets of data of an artificial neural network. Hereinafter, terms a "first memory," a "primary memory," and a "universal memory" will be interchangeably used. The first memory 310 includes a plurality of SRAM instances. The first memory 310 may be divided into various parts, which may be configured as a plurality of banks that is independently accessible. The first memory 310 includes a bank arbitration logic 315 configured to arbitrate a request for access to the banks of the first memory 310 and allow memory access to be transferred to the banks in sequential order if possible. A control signal for the bank arbitration logic 315 may be transferred from outside the neural processing device 300 or be generated inside the neural processing device 300. According to examples, the first memory 310 may be a scratchpad RAM, for example.

The second memory 330 may be distinguished from the first memory 310, and have a capacity less than that of the first memory 310. The second memory 330 includes a plurality of SRAM instances and is configured with a plurality of banks in the first memory 310. The second memory 330 may also be referred to as secondary memory or a dedicated memory in that it operates as a dedicated memory for a certain operation, such as, for example, storing a partial sum result that is generated during the operation. Hereinafter, terms a "second memory," a "secondary memory," and "dedicated memory" will be interchangeably used.

Similar to the first memory 310, the second memory 330 includes a bank arbitration logic 335 configured to arbitrate a request for access to the banks of the second memory 330 and allow memory access to be transferred to the banks in sequential order if possible.

The bandwidth control module 350 includes a bandwidth (or indicated as BW or B/W) control path 355 (or indicated as B/W controlled path), a plurality of 2-to-1 muxes 351, 352, and 353, and a 3-to-1 mux 357.

The bandwidth control path 355 may reconfigure a memory bandwidth for memory clients 360, 370, and 380 such that they use any one of the first memory 310 and the second memory 330 based on a control signal of the control logic 390. The memory clients 360, 370, and 380 may include, for example, an input feature map-related client 360, a weight-related client 370, and a partial sum- or output feature map-related client 380, but examples of which are not limited thereto. The input feature map-related client 360 may be a client that performs operations of fetching, reading, computing, and storing an input feature map. The weight-related client 370 may be a client that performs operations of fetching, reading, computing, and storing weight. The partial sum or output feature map-related client 380 may be a client that performs operations of fetching, reading, computing, and storing a partial sum result or an output feature map.

The control logic 390 may calculate a target capacity for data of a target client that is determined based on a layer configuration of the artificial neural network from among the memory clients 360, 370, and 380. The layer configuration may be construed as a form of a configuration of layers based on a type of the artificial neural network, for example, whether the artificial neural network is formed with fully connected layers, convolution layers, or recurrent layers. The target client may be construed as a client of which data is to be a target to be stored in the second memory 330 among the memory clients 360, 370, and 380.

The control logic 390 may generate a control signal such that the data of the target client is stored in the second memory 330 based on a result of comparing the target capacity and the capacity of the second memory 330.

In response to the target capacity being greater than the capacity of the second memory 330, the control logic 390 may generate the control signal such that the data of the target client is stored in the first memory 310, thereby limiting the bandwidth of the first memory 310 for data of at least one remaining client of the memory clients 360, 370, and 380 from which the target client is excluded. In contrast, in response to the target capacity being less than or equal to the capacity of the second memory 330, the control logic 390 may generate the control signal such that the data of the target client is stored in the second memory 330, thereby increasing the bandwidth of the first memory 310 for the data of the at least one remaining client of the memory clients 360, 370, and 380 from which the target client is excluded.

In a case of a sufficient bandwidth of the first memory 310, the control logic 390 may allow all sets of data to be stored in the first memory 310. However, in a case of an insufficient bandwidth of the first memory 310, the control logic 390 may use the second memory 330 as a dedicated secondary memory for data of a small size based on the layer type and the layer configuration of the artificial neural network.

Hereinafter, how the bandwidth control path 355 reconfigures a memory bandwidth for memory clients based on a control signal will be described with reference to FIG. 4. In addition, a data path and a control path of the bandwidth control module 350 will be described with reference to FIG. 5.

Figure 4A:
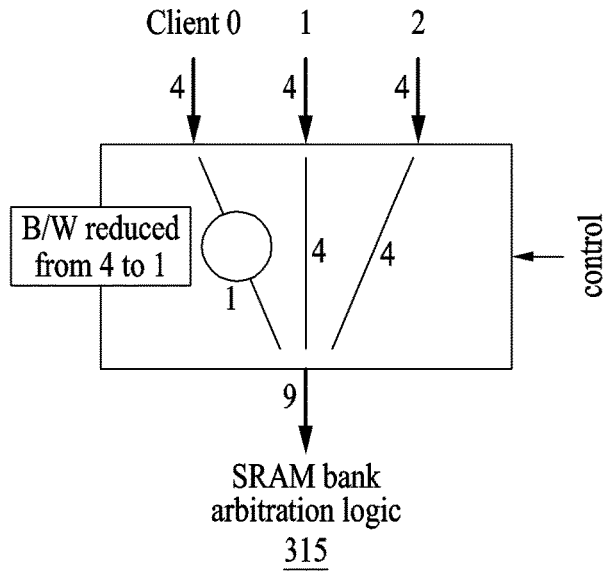
FIGS. 4A and 4B illustrate examples of an internal structure of a bandwidth control path illustrated in FIG. 3.
Figure 4A:
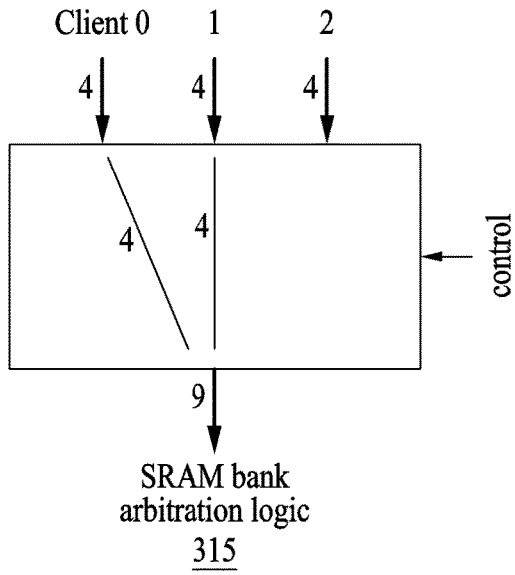
Figure 4B:
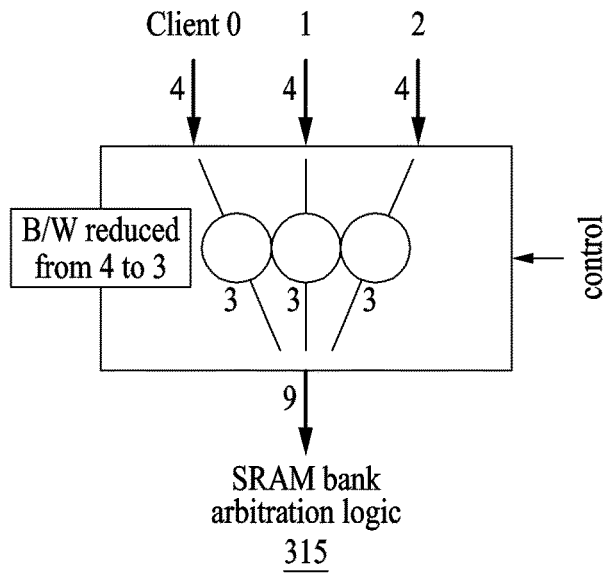
Figure 4B:
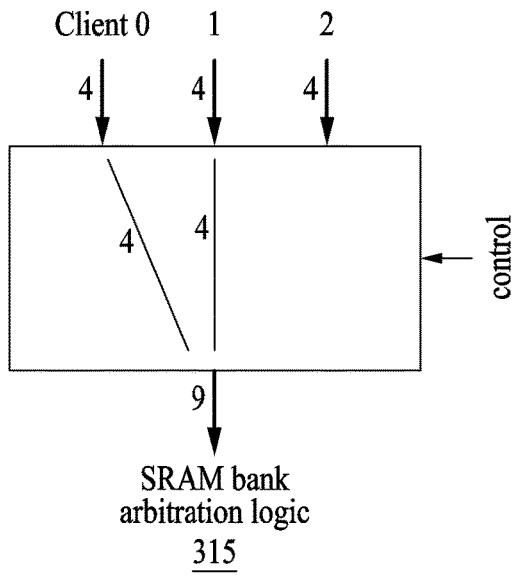
Figure 5:
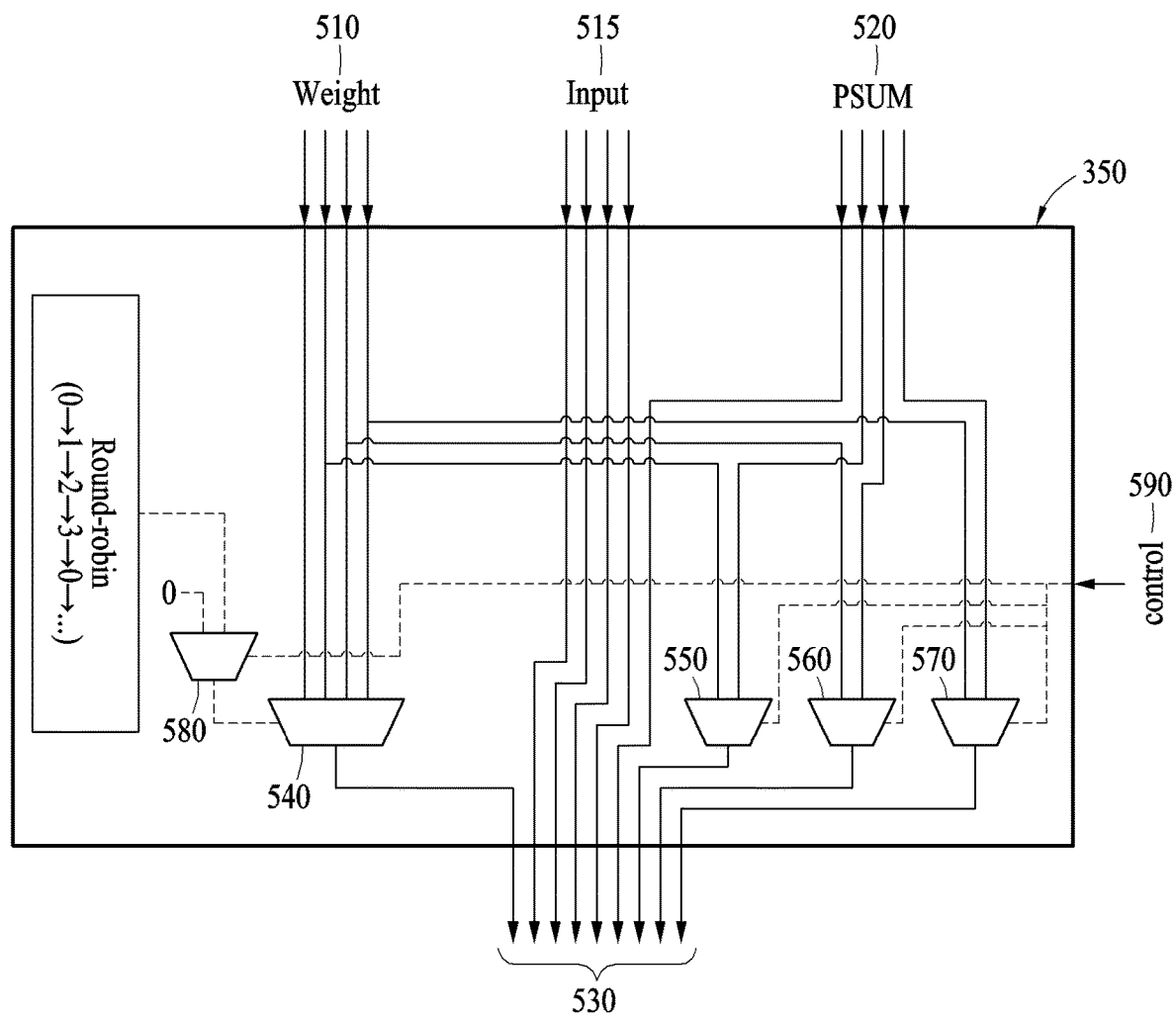
FIG. 5 illustrates an example of a data path and a control path of a bandwidth control path.

FIGS. 4A and 4B illustrate examples of an internal structure of the bandwidth control path 355 illustrated in FIG. 3. FIG. 5 illustrates an example of a data path and a control path of the bandwidth control module 350 illustrated in FIG. 3.

Referring to FIGS. 4A and 5, memory clients, for example, Client 0, Client 1, and Client 2, may be connected to a bank arbitration logic (e.g., the bank arbitration logic 315 illustrated in FIG. 3) through a bandwidth control path. The memory clients Clients 0, 1, and 2 may respectively correspond to a weight-related client, an input feature map- or input-related client, and a partial sum request-related client, as illustrated in FIG. 5.

For example, in a case in which a capacity of a first memory is greater than the data capacity of the memory clients Clients 0, 1, and 2, a control logic may generate a control signal such that the bandwidth control path operates in a normal mode that uses the first memory for data of a target client that is determined based on a layer type and a layer configuration of an artificial neural network.

In contrast, in a case in which the capacity of the first memory is less than or equal to the data capacity of the memory clients, the control logic may generate the control signal such that the bandwidth control path operates in a boost mode that uses a second memory for the data of the target client that is determined based on the layer type and the layer configuration of the artificial neural network. The control logic may set one (e.g., the target client) of the memory clients Clients 0, 1, and 2 such that the one uses the second memory, and increase the bandwidth of the first memory for remaining clients excluding the target client.

As described above, the bandwidth control path may reconfigure a memory bandwidth for the memory clients Clients 0, 1, and 2 based on the control signal. For example, four ports may be allocated to each of the memory clients Clients 0, 1, and 2.

Referring to FIGS. 4A and 5, a neural processing device includes 12 input ports connected to a data fetcher and nine output ports 530 connected to the band arbitration logic of the first memory. The 12 input ports include four first input ports for a request from a weight-related first client 510 among memory clients, four second input ports for a request from an input feature map- or input-related second client 515 among the memory clients, and four third input ports for a request from a partial sum-related third client 520 among the memory clients.

A line connected to the four first input ports for the request from the weight-related first client 510 may be connected to a 4-to-1 mux 540. Here, the remaining three first input ports of the four first input ports for the weight-related first client 510 from which one first input port is excluded may be connected respectively to three third input ports for the partial sum-related third client 520 and three 2-to-1 muxes 550, 560, and 570.

In addition, the four second input ports for the input feature map-related second client 515 may be connected directly to four output ports among the nine output ports 530.

For example, in a case in which all the memory clients Clients 0, 1, and 2 use the first memory (or primary memory), the bandwidth of the first memory for a first client or Client 0 (that is, the weight-related first client 510 in FIG. 5) among the memory clients Clients 0, 1, and 2 may be limited (or reduced) to 1 from 4 as illustrated in a left portion of FIG. 4A.

The control logic may provide a select signal for the 4-to-1 mux 540 connected to all the four first input ports for the weight-related first client 510 in sequential order by rotation, for example, 0→1→2→3→0→1 . . . , through a round-robin method. The select signal for the 4-to-1 mux 540 may be provided through a 2-to-1 mux 580 connected to a control signal 590. The three 2-to-1 muxes 550, 560, and 570 may select requests from the partial sum-related third client 520 based on the control signal 590 and connect the selected requests to the output ports 530.

For example, in a case in which Client 2 (that is, the partial sum-related third client 520 in FIG. 5) among the memory clients Clients 0, 1, and 2 uses the second memory (or secondary or dedicated memory), the bandwidth of the first memory for the first client or Client 0 (that is, the weight-related first client 510 in FIG. 5) among the memory clients Clients 0, 1, and 2 may increase to 4 from 1 as illustrated in a right portion of FIG. 4A.

In this example, the control logic may provide a select signal for the one first input port (first line) that is excluded from the connection to the 2-to-1 muxes 550, 560, and 570 among the four first input ports connected to the 4-to-1 mux 540. The 2-to-1 muxes 550, 560, and 570 may select, respectively, lines of the remaining three first input ports, excluding the one first input port (first line), and connect them to the output ports 530. In this example, Client 2 or the partial sum-related third client 520 uses the second memory, and thus a request may not be transferred to Client 2 or the partial sum-related third client 520.

FIG. 4B illustrates another example different from the example of FIG. 4A. In the example of FIG. 4B, all the memory clients Clients 0, 1, and 2 may use the primary memory. In this example, a bandwidth of the primary memory for all the memory clients Clients 0, 1, and 2 may be limited (or reduced) to 3 from 4. For example, in a case in which Client 2 among the memory clients Clients 0, 1, and 2 uses the dedicated memory as illustrated in a left portion of FIG. 4B, the control logic may increase bandwidth for a first client (e.g., Client 0) and a second client (e.g., Client 1) to 4 from 3 as illustrated in a right portion of FIG. 4B.

Figure 6:
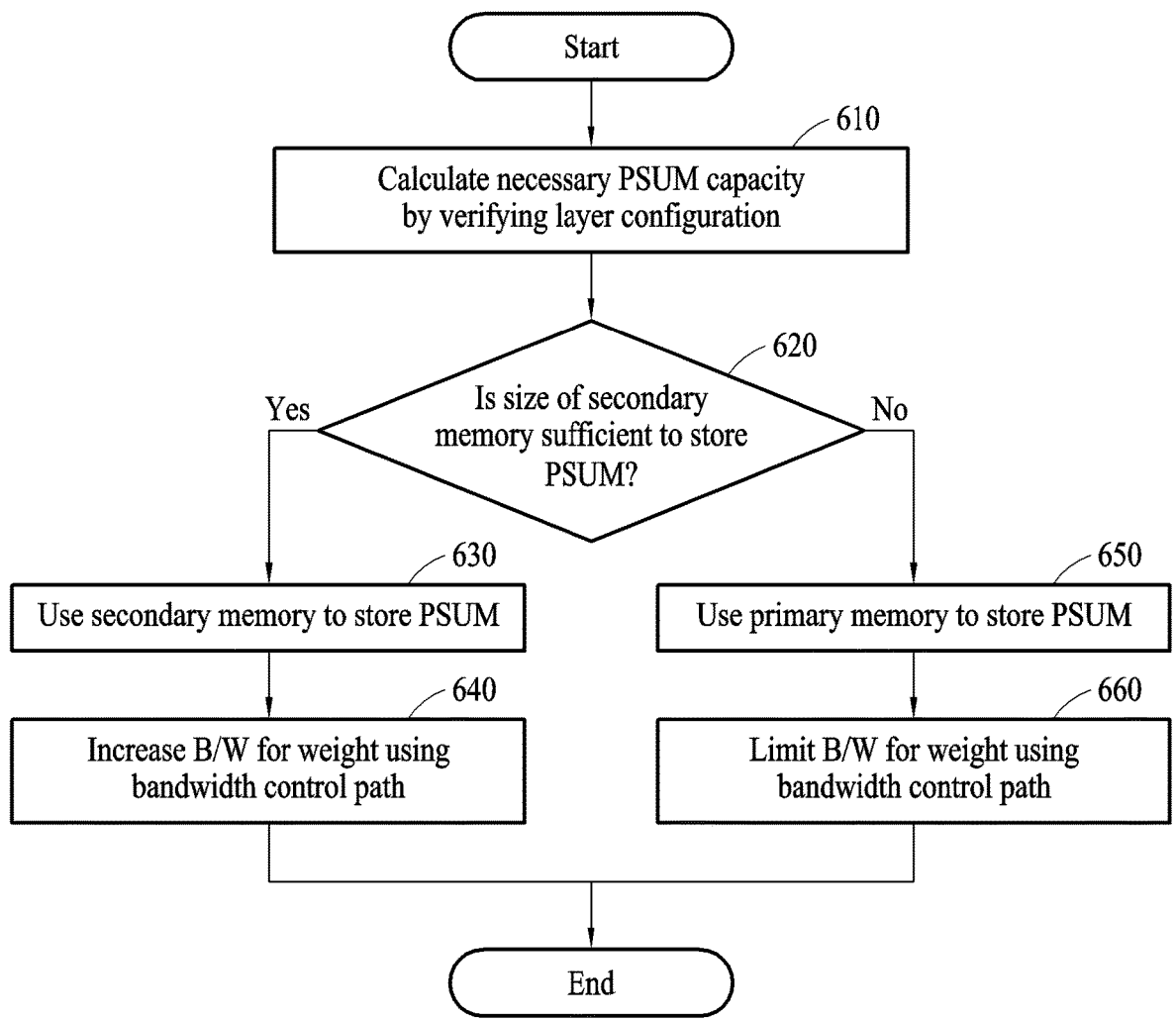
FIG. 6 illustrates an example of a flow of operations of a neural processing device.

FIG. 6 illustrates an example of a flow of operations of a neural processing device. Referring to FIG. 6, a neural processing device may reconfigure a memory bandwidth for data of a target client by performing operations 610 through 660 to be described hereinafter. For the convenience of description, the example of FIG. 6 will be described based on a case in which the target client is a partial sum-related client (e.g., the partial sum-related third 520 in FIG. 5), but examples of which are not limited thereto. For the convenience of describing the example of FIG. 6, data of the partial sum-related client will be indicated as PSUM.

In operation 610, the neural processing device calculates a necessary capacity for PSUM by verifying a layer configuration of an artificial neural network.

In operation 620, the neural processing device determines whether the size of a secondary memory is sufficient to store the PSUM.

In a case in which the size of the secondary memory is determined to be sufficient to store the PSUM in operation 620, the neural processing device uses the secondary memory to store the PSUM in operation 630, and increases the bandwidth of a primary memory for other clients (e.g., a weight-related client), excluding the target client using a bandwidth control path in operation 640. Rather than storing the PSUM in the secondary memory, the neural processing device may increase the bandwidth of the primary memory for the remaining clients, excluding the partial sum-related client among memory clients, thereby preventing performance degradation that may occur due to a lack of bandwidth of the primary memory.

In contrast, in a case in which the size of the secondary memory is determined to be insufficient in operation 620, the neural processing device may use the primary memory to store the PSUM in operation 650, and limit (or reduce) the bandwidth of the primary memory for the clients, for example, the weight-related client, using the bandwidth control path in operation 660.

Figure 7:
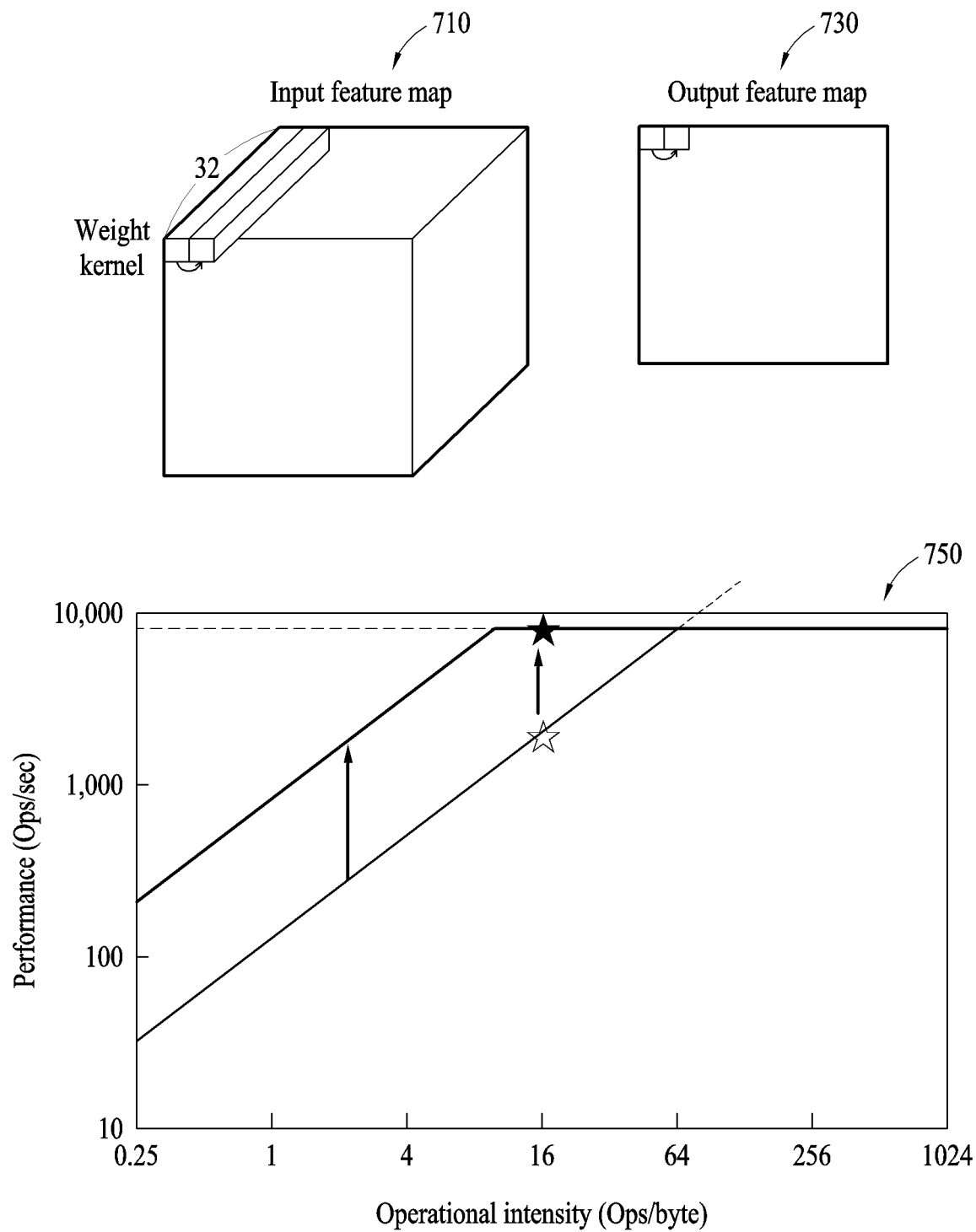
FIG. 7 illustrates an example of an operation and a roofline model in a case in which a first client associated with weight uses a second memory.

FIG. 7 illustrates an example of an operation and a roofline model in a case in which a first client associated with weight uses a second memory. Referring to FIG. 7, illustrated are an input feature map 710 and an output feature map 730 of an artificial neural network including convolution layers, and a roofline model 750 of a partial sum-related client.

For example, the artificial neural network may include convolution layers with a size of 192×32×1×1. In this example, 192 bytes may be an output channel size, 32 bytes may be an input channel size, and a kernel size may be 1×1, as illustrated in the input feature map 710 and the output feature map 730. In this example, a weight size may be 12 kilobytes (Kbytes).

The artificial neural network, including the layers having the small input channel and kernel size illustrated in FIG. 7 may have a small number of accumulation times. A weighted sum of the input feature map 710 in the artificial neural network may be obtained, and an output channel may be generated. The input channel size of the input feature map 710 may be 32 bytes, and thus an output such as the output feature map 730 may be generated only 32 times and then be stored in a memory. In such a case, an operational intensity of a partial sum-related client may be, for example, 16 ops/byte (=2 ops×32×1×1/4 byte), in which 2 ops corresponds to multiply+accumulate (MAC), and 32 corresponds to the number of input channels accumulated during a calculation of a single output pixel. In addition, 1×1 corresponds to the number of MACs in a kernel direction because FIG. 7 uses a 1×1 convolution. In addition, 4 bytes correspond to the number of bytes that is assumed to be needed to calculate a single output pixel in a partial sum.

For example, in a case in which the operational intensity is 16 ops/byte in the roofline model 750, the artificial neural network architecture may be memory-bound. In this example, the neural processing device may determine that a weight-related client uses a second memory.

The neural processing device may improve performance by increasing the bandwidth of a first memory for remaining clients (e.g., the partial sum- and/or output feature map-related client), excluding the weight-related client that exclusively uses the second memory.

The neural processing device may store weight in the second memory and increase a memory bandwidth of the first memory for the partial sum- or output feature map-related client (or a third client), among memory clients, based on the input channel and kernel size of the convolution layers.

Figure 8:
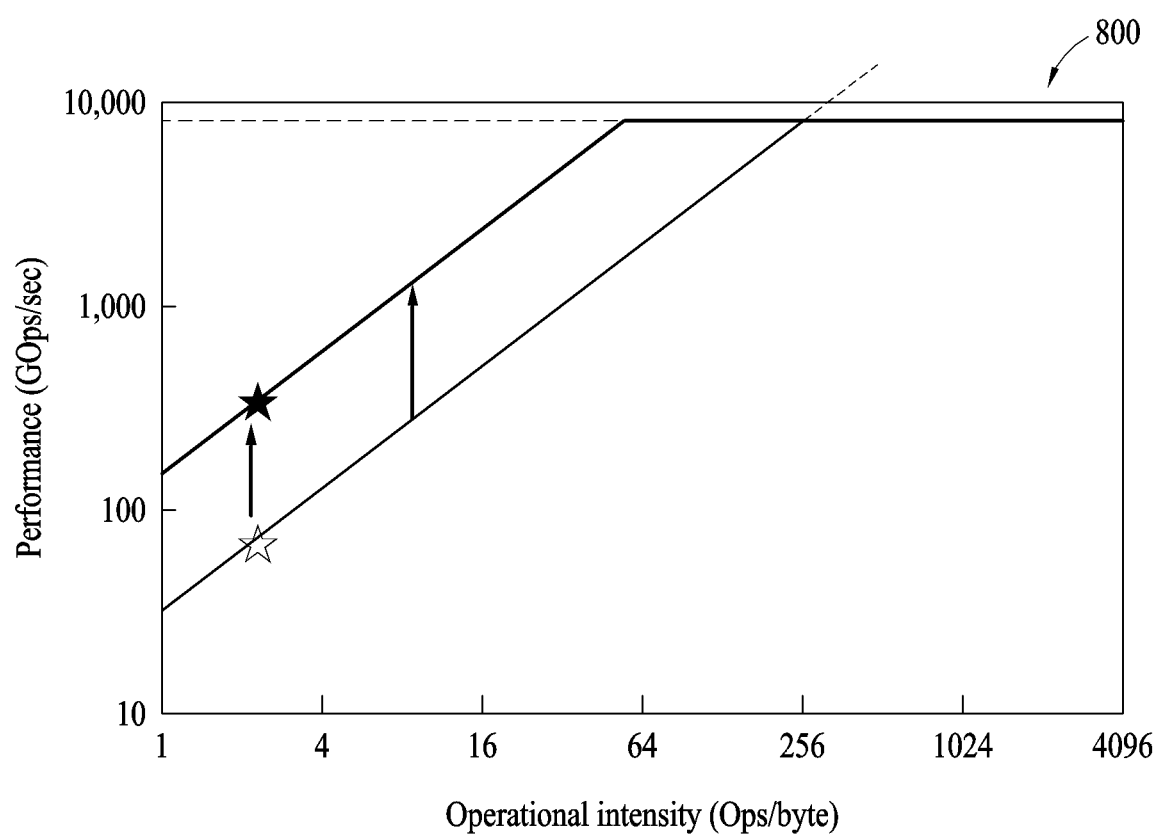
FIG. 8 illustrates an example of an operation and a roofline model in a case in which a second client associated with a feature map uses a second memory.

FIG. 8 illustrates an example of an operation and a roofline model in a case in which a second client associated with a feature map uses a second memory. Referring to FIG. 8, illustrated is a roofline model 800 of weight in a case in which a second client associated with a feature map uses a second memory.

For example, an artificial neural network may include fully connected layers of 2048×1024, and the size of an input feature map may be 2 Kbytes, and the size of an output feature map may be 1 Kbyte. In this example, the weight of each of the fully connected layers may be extremely large, and the size of feature maps may be small. Thus, a neural processing device may determine that a feature map-related client (e.g., the second client) associated with the feature maps of small size uses the second memory.

There may be no recurrence in the fully connected layers, and thus weight reuse may not occur. Thus, an operational intensity may be 2 ops/byte. In a case in which the operational intensity is 2 ops/byte in the roofline model 800, an architecture of the artificial neural network may be memory-bound. In such a case, the neural processing device may improve performance by storing data of the feature maps in the second memory and increasing the memory bandwidth of the first memory for a first client associated with weight among memory clients.

Figure 9:
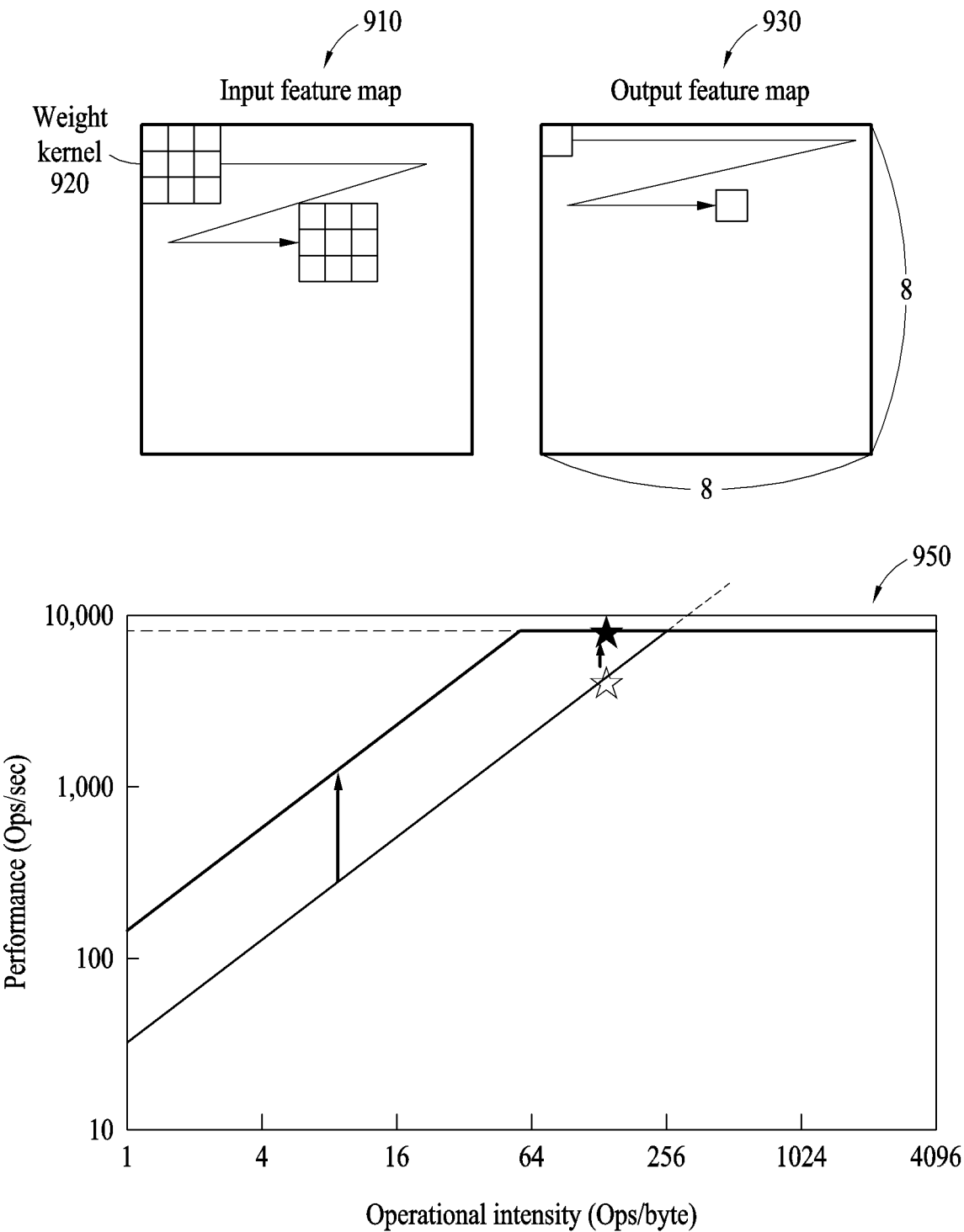
FIG. 9 illustrates an example of an operation and a roofline model in a case in which a third client associated with a partial sum uses a second memory.

FIG. 9 illustrates an example of an operation and a roofline model in a case in which a third client associated with a partial sum uses a second memory. Referring to FIG. 9, illustrated are an input feature map 910 and an output feature map 930 of an artificial neural network including convolution layers, and a roofline model 950 of a weight-related client.

For example, the artificial neural network may include convolution layers of 448×384×3×3, 448 bytes may be an output channel size and 384 bytes may be an input channel size, and 3×3 may be a size of a weight kernel 920. In a case in which the size of the input feature map 910 and the output feature map 920 is 8×8 and the number of bytes is 4, a target capacity for data of a partial sum may be 96 Kbytes (=448×8×8×4), a layer with a small size of a feature map may have a small number of times of weight reuse. An operational intensity of the weight may be 128 ops/byte (=2×8×8).

In a case in which the operational intensity in the roofline model 950 is 128 ops/byte, the artificial neural network architecture may be memory-bound. In such a case, the neural processing device may improve performance by storing the data of the partial sum in a second memory and increasing a memory bandwidth of the first memory for a first client associated with weight among memory clients, based on the size of the feature map of the convolution layers.

Figure 10:
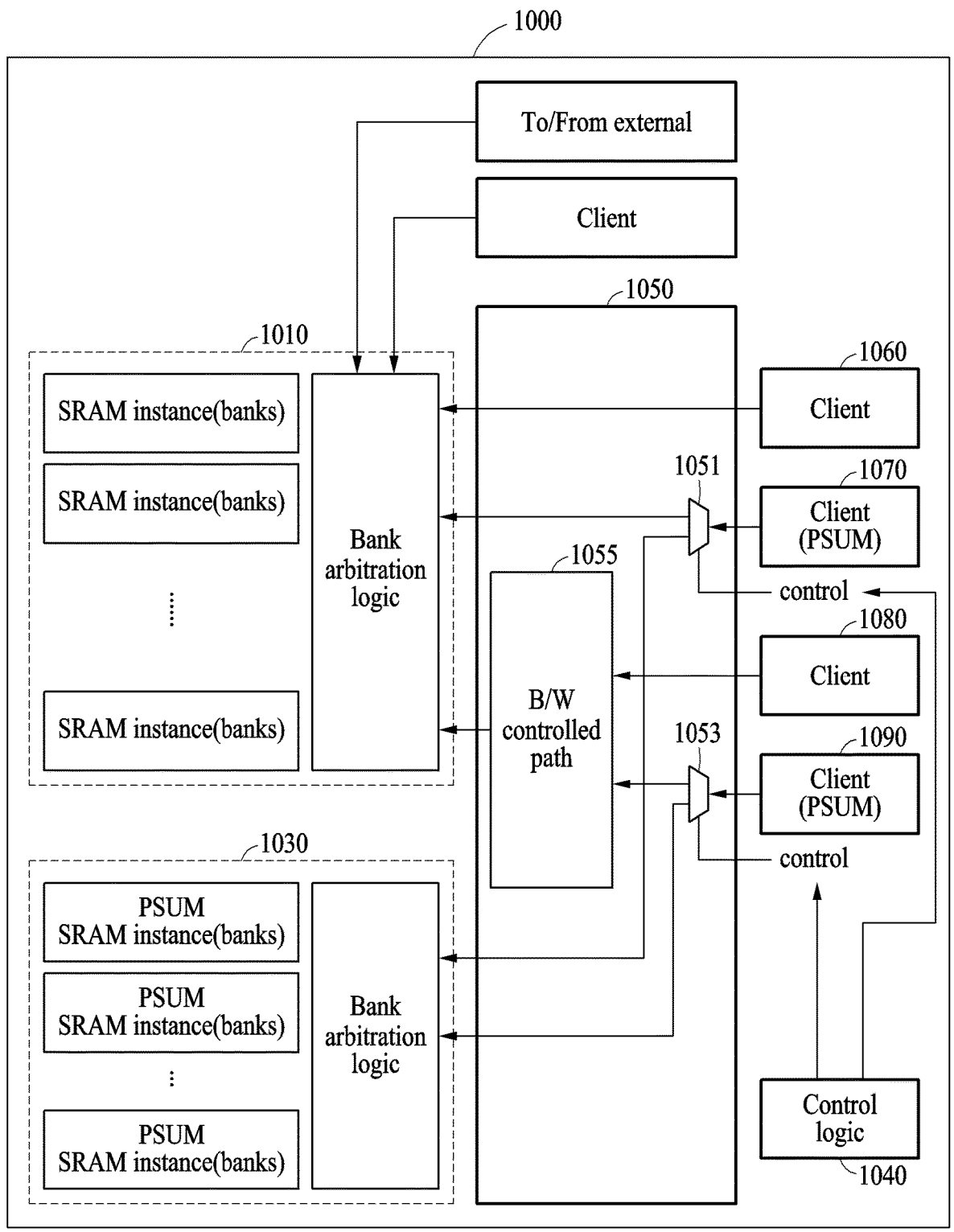
FIG. 10 illustrates another example of a neural processing device.

FIG. 10 illustrates another example of a neural processing device. Referring to FIG. 10, a neural processing device 1000 includes a first memory 1010, a second memory 1030, and a bandwidth control module 1050.

The first memory 1010 may store, for example, a feature map, weight, a result of a partial sum, and the like.

The second memory 1030 may be independent of the first memory 1010, and has a limited size, which may be a dedicated memory for a partial sum, for example. The result of the partial sum may be selectively stored in the first memory 1010 or the second memory 1030.

The bandwidth control module 1050 may determine a memory in which the result of the partial sum is to be stored by reconfiguring a bandwidth of the memories 1010 and 1030 through an interface, that is, a bandwidth control path 1055, that selects one from between the two memories 1010 and 1030 based on a control signal of a control logic 1040.

The control logic 1040 may generate the control signal such that the first memory 1010 is used when small memory bandwidth is required, and the second memory 1030 is used as a dedicated memory for a partial sum when great memory bandwidth is required. Thus, it is possible to prevent performance degradation that may occur due to a conflict between memory banks while using the memories 1010 and 1030 more effectively.

For example, clients that read or write a partial sum result, for example, clients 1070 and 1090, may be connected to the first memory 1010 or the second memory 1030 through the bandwidth control path 1055 based on the control signal of the control logic 1040. In this example, remaining clients 1060 and 1080 excluding the clients 1070 and 1090 connected to the second memory 1030 may receive a greater bandwidth provided by the first memory 1010 through the bandwidth control path 1055.

For example, in a case in which only the first memory 1010 is used, the bandwidth control module 1050 may divide the bandwidth of the first memory 1010 and provide the divided bandwidth to all the clients 1060, 1070, 1080, and 1090 connected to the bandwidth control path 1055 based on the control signal. Unlike this example, in a case in which the clients 1070 and 1090 use the second memory 1030, the bandwidth control module 1050 may provide the bandwidth of the first memory 1010 to the remaining clients 1060 and 1080 excluding the clients 1070 and 190 associated with a partial sum through the bandwidth control path 1055.

Figure 11:
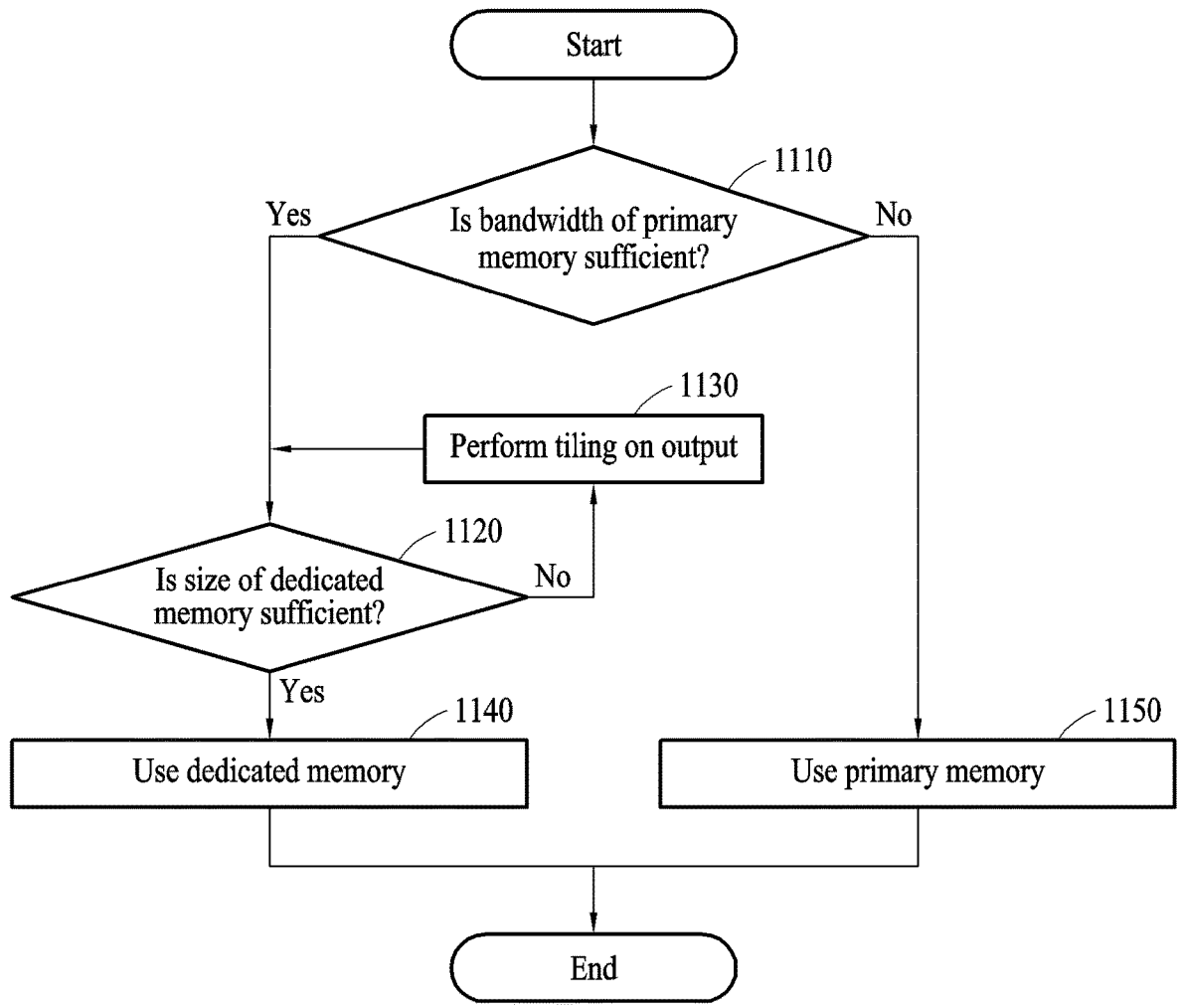
FIG. 11 illustrates another example of a flow of operations of a neural processing device.

FIG. 11 illustrates another example of a flow of operations of a neural processing device. Referring to FIG. 11, a neural processing device may determine a memory that is to be used from between primary memory and a dedicated memory by performing operations 1110 through 1150 to be described hereinafter. The neural processing device may include a memory unit including the primary memory and the dedicated memory for a partial sum.

In operation 1110, the neural processing device determines whether a bandwidth of the primary memory is insufficient to perform an operation associated with a layer of an artificial neural network.

In operation 1120, when the bandwidth of the primary memory is determined to be insufficient to perform the operation associated with the layer of the artificial neural network in operation 1110, the neural processing device determines whether the size of the dedicated memory is sufficient to store a partial sum result. In operation 1130, when the size of the dedicated memory is determined to be insufficient to store all the partial sum result in operation 1120, the neural processing device performs tiling on an output (or output matrix) of the layer of the artificial neural network until the dedicated memory is available to use. The neural processing device may repeatedly determine whether the dedicated memory size is sufficient to store the tiled output (or output matrix). In operation 1140, when the dedicated memory size is determined to be sufficient in operation 1120, the neural processing device stores the partial sum result or the tiled output of the layer using the dedicated memory.

In operation 1150, when the bandwidth of the primary memory is determined to be sufficient to perform the operation associated with the layer of the artificial neural network in operation 1110, the neural processing device performs the operation associated with the layer of the artificial neural network using the primary memory.

Figure 12A:
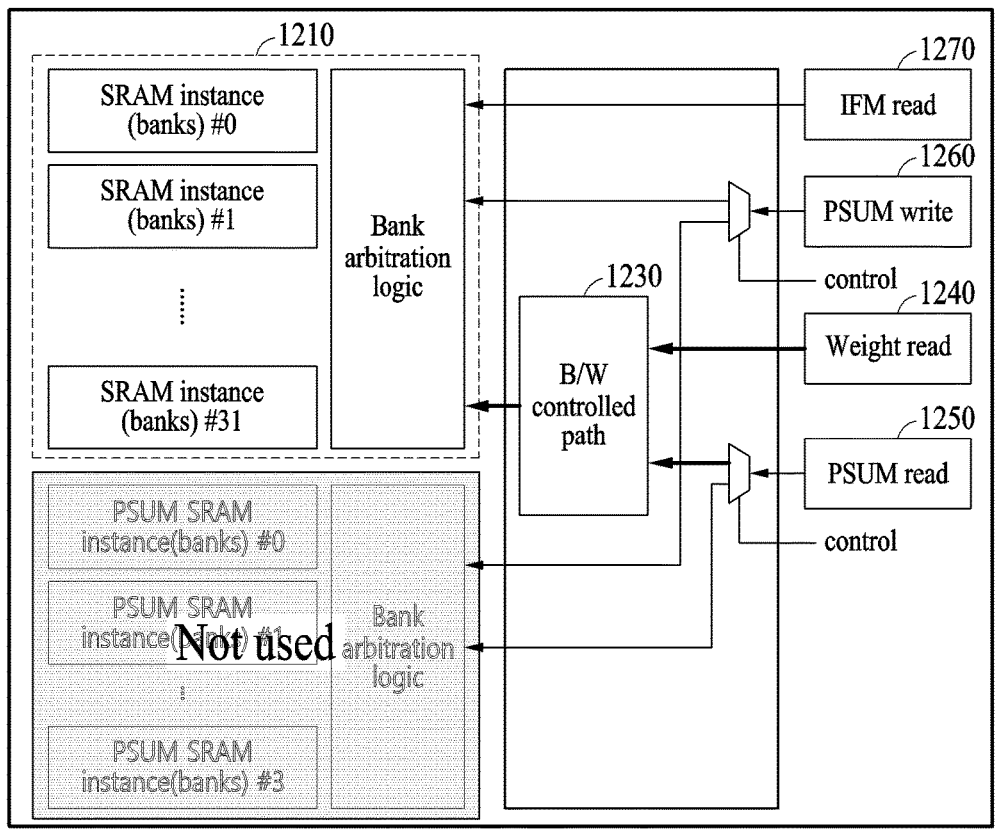
FIGS. 12A and 12B illustrate an example of using a first memory and a second memory by a neural processing device for the data of a target client.
Figure 12B:
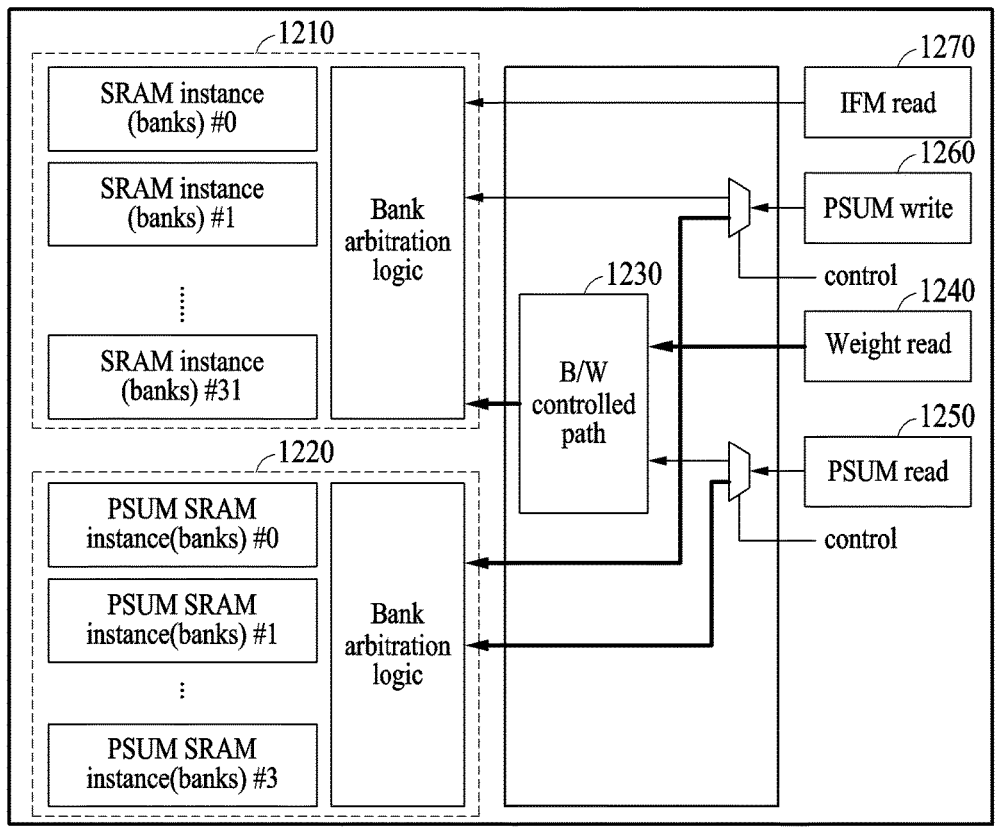
Figure 13:
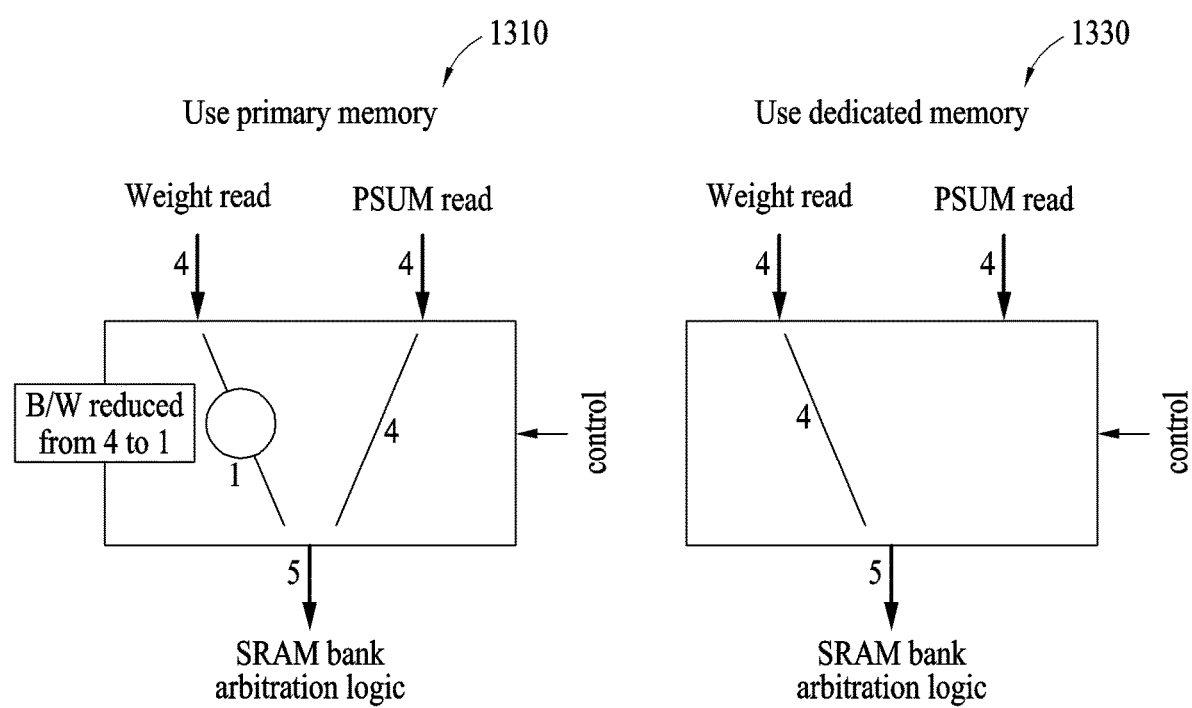
FIG. 13 illustrates an example of a bandwidth control bus.

FIGS. 12A and 12B illustrate an example of using a first memory by a neural processing device for data of a target client, and an example of using a second memory by the neural processing device for the data of the target client. FIG. 13 illustrates an example of a bandwidth control bus.

Referring to FIG. 12A, illustrated is a connected relationship between a bandwidth control path 1230 and clients 1240, 1250, 1260, and 1270 in a case in which a neural processing device uses a first memory 1210 for data of a target client. Referring to FIG. 12B, illustrated is a connected relationship between the bandwidth control path 1230 and the clients 1240, 1250, 1260, and 1270 in a case in which the neural processing device uses both the first memory 1210 and a second memory 1220

The first memory 1210 may have a capacity of 1 megabyte (Mbyte), for example. The second memory 1220 may have a capacity of 48 Kbytes, for example.

For example, in a case in which a size of an output feature map is greater than 16×16, in which 16×16 corresponds to a height and width of a pixel unit, and the neural processing device generates 32 output channels at once, and 6 bytes are needed for each pixel to perform a partial sum, the capacity of the second memory 1220 may be 48 Kbytes (=32×16× 16×6).

In this example, a target capacity for the data of the target client may be greater than the capacity (e.g., 48 Kbytes) of the second memory 1220, and thus the neural processing device may generate a control signal such that the bandwidth control path 1230 operates in a normal mode that uses the first memory 1210. The bandwidth control path 1230 may transfer data of clients to the first memory 1210 by reducing four channels of the client 1240, which is a weight read client to one while maintaining four channels for the client 1250, which is a partial sum read client, based on the control signal for the operation in the normal mode, as illustrated in a left portion 1310 of FIG. 13. In this example, the second memory 1220 may not be used.

For another example, in a case in which the size of the output feature map is less than or equal to 16×16, the target capacity for the data of the target client may be less than the capacity (e.g., 48 Kbytes) of the second memory 1220. Thus, the neural processing device may generate a control signal such that the bandwidth control path 1230 operates in a boost mode that uses the second memory 1220. The bandwidth control path 1230 may transfer data of the client 1240, which is the weight read client to the first memory 1210, while maintaining the four channels for the client 1240 based on the control signal for the operation in the boost mode, as illustrated in a right portion 1330 of FIG. 13. In this example, the four channels for the client 1250, the partial sum read client, may be connected to the second memory 1220.

For example, in a case in which a total number of all memory clients is 20 (=8 IFM read+4 weight read+4 PSUM read+4 OFM write), the number of clients in the first memory 1210 may be 17 (=8 IFM read+1 weight read+4 PSUM read+4 PSUM write) in the normal mode, and be reduced to 12 (=8 IFM read+4 weight read) in the boost mode.

Referring to FIG. 12B, the weight read client 1240 and the partial sum read client 1250 may be connected to the bandwidth control path 1230. The input feature map read client 1270 may be connected only to the first memory 1210, and the partial sum write client 1260 may be selectively connected to the first memory 1210 or the second memory 1220.

For example, in a case where only the first memory 1210 is used, as illustrated in FIG. 12A, a bandwidth control bus may divide the bandwidth of the first memory 1210 and provide the divided bandwidth to the partial sum read client 1250 and the weight read client 1240, and thus an amount to be allocated to the weight read client 1240 may be reduced.

For another example, in a case where both the first memory 1210 and the second memory 1220 are used, as illustrated in FIG. 12B, the bandwidth control bus may provide sufficient bandwidth to the weight read client 1240 by the first memory 1210.

For example, when a spatial dimension of an output of the neural processing device that fully reuses the weight in a spatial direction is greater than a predetermined criterion, the number of times of weight reuse may increase. Thus, a great bandwidth may not be required for the weight read client 1240. However, in a case in which the spatial dimension of the output is less than the criterion, the number of times of weight reuse may decrease, and thus a greater bandwidth may be required for the weight read client 1240 due to the decrease in the number of times of weight reuse. In such a case, the neural processing device may use the second memory 1220 to prevent performance degradation that may occur due to a lack of the bandwidth of the first memory 1210.

Figure 14:
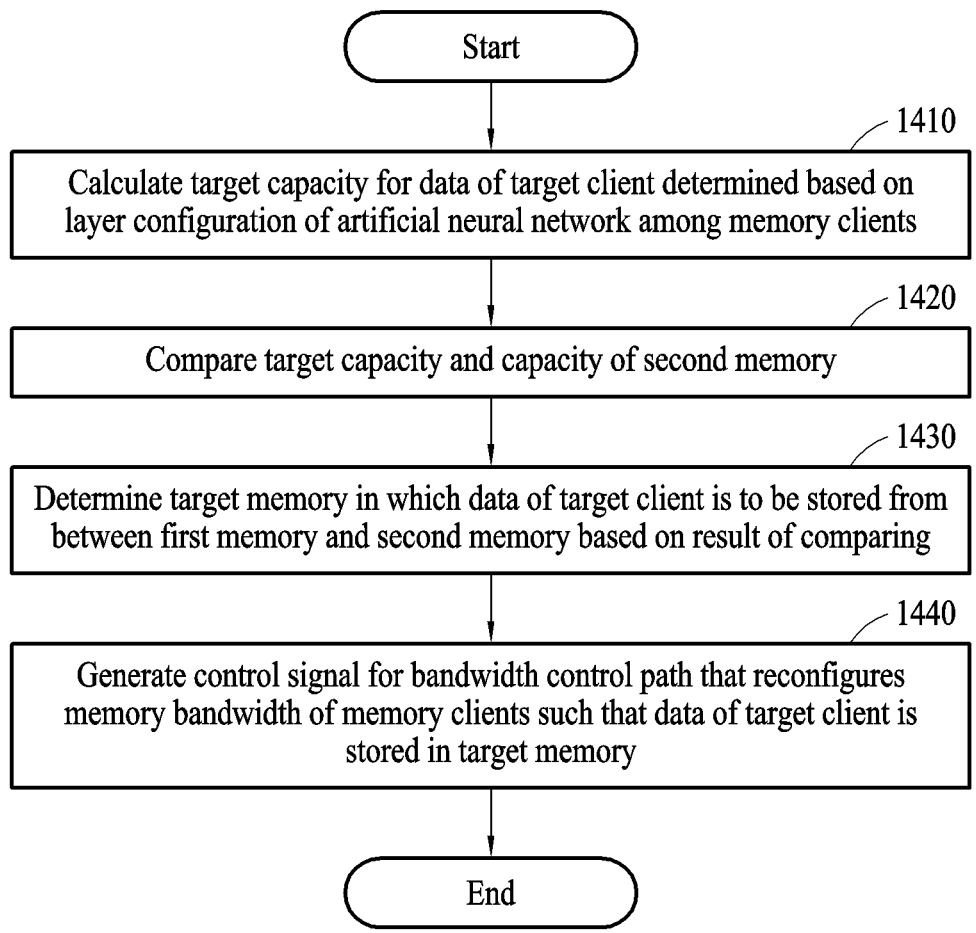
FIG. 14 illustrates an example of a flow of operations of a neural processing device.

FIG. 14 illustrates an example of a flow of operations of a neural processing device. Referring to FIG. 14, a neural processing device may generate a control signal for a bandwidth control path by performing operations 1410 through 1440 to be described hereinafter. The neural processing device may include a first memory and a second memory with a smaller capacity than the first memory.

In operation 1410, the neural processing device calculates a target capacity for data of a target client that is determined based on a layer configuration of an artificial neural network from among memory clients. The memory clients may be associated with at least one of an input feature map, weight, and a partial sum or an output feature map, but examples are not limited thereto.

In operation 1420, the neural processing device compares the target capacity calculated in operation 1410 and the capacity of the second memory.

In operation 1430, the neural processing device determines a target memory in which the data of the target client is to be stored from between the first memory and the second memory based on a result of the comparing in operation 1420. In response to the target capacity being greater than the capacity of the second memory as the result of the comparing in operation 1420, the neural processing device may determine the first memory to be the target memory. In contrast, in response to the target capacity being less than or equal to the capacity of the second memory as the result of the comparing in operation 1420, the neural processing device may determine the second memory to be the target memory.

In operation 1440, the neural processing device generates a control signal for a bandwidth control path that reconfigures a memory bandwidth for the memory clients such that the data of the target client is stored in the target memory determined in operation 1430.

For example, in a case in which the first memory is determined to be the target memory in operation 1430, the neural processing device may generate the control signal such that the data of the target client is stored in the first memory in operation 1440, thereby limiting (or reducing) the bandwidth of the first memory for data of at least one remaining client of the memory clients from which the target client is excluded. In contrast, in a case in which the second memory is determined to be the target memory in operation 1430, the neural processing device may generate the control signal such that the data of the target client is stored in the second memory in operation 1440, thereby increasing the bandwidth of the first memory for the data of the at least one remaining client of the memory clients from which the target client is excluded.

Alternatively, the neural processing device may compare the capacity of the first memory and the data capacity of the memory clients. In response to the capacity of the first memory being greater than the data capacity of the memory clients as a result of the comparing, the neural processing device may generate the control signal such that the bandwidth control path operates in a normal mode that uses the first memory for the data of the target client that is determined based on a layer type of the artificial neural network and the layer configuration of the artificial neural network, in operation 1440. In contrast, in response to the capacity of the first memory being less than or equal to the data capacity of the memory clients as the result of the comparing, the neural processing device may generate the control signal such that the bandwidth control path operates in a boost mode that uses the second memory for the data of the target client that is determined based on the layer type and the layer configuration of the artificial neural network, in operation 1440.

For example, in a case in which the artificial neural network includes a convolution layer and the target client is the first client associated with weight, the neural processing device may store the weight in the second memory based on an input channel and kernel size of the convolution layer, in operation 1440. In this example, the neural processing device may increase the memory bandwidth of the first memory for a third client associated with a partial sum or output feature map among the memory clients.

For another example, when the artificial neural network includes a fully connected layer and the target client is a second client associated with a feature map, the neural processing device may store data of the feature map in the second memory in operation 1440. In this example, the neural processing device may increase the memory bandwidth of the first memory for the first client associated with the weight among the memory clients.

For still another example, in a case in which the artificial neural network includes a convolution layer and the target client is a third client associated with a partial sum, the neural processing device may store data of the partial sum in the second memory based on a size of a feature map of the convolution layer in operation 1440. In this example, the processing device may increase the memory bandwidth of the first memory for the first client associated with the weight among the memory clients.

The neural processing device, NPU 110, storage 111, input feature map fetcher 112, weight fetcher 113, PSUM fetcher 114, OFM writer 115, DRAM 130, neural processing device 300, 1000, first memory 310, 1010, second memory 330, 1030, bandwidth control module 350, 1050, control logic 390, 1040 and other devices, apparatuses, units, modules, and components described herein with respect to FIGS. 1, 3, 5, 7, 9, 10, and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A neural processing device comprising:
a first memory configured to store universal data;
a second memory distinguished from the first memory and having a capacity less than that of the first memory;
a bandwidth control path configured to reconfigure a memory bandwidth for memory clients to use one of the first memory and the second memory based on a control signal; and
a control logic configured to calculate a target capacity for data of a target client of the memory clients determined based on a layer configuration of an artificial neural network, and generate the control signal to store the data of the target client in the second memory based on a result of comparing the target capacity and the capacity of the second memory.

2. The neural processing device of claim 1, wherein the control logic is further configured to:
in response to the target capacity being greater than the capacity of the second memory, generate the control signal to store the data of the target client in the first memory and decrease a bandwidth of the first memory for data of at least one remaining client of the memory clients from which the target client is excluded.

3. The neural processing device of claim 1, wherein the control logic is further configured to:
in response to the target capacity being less than or equal to the capacity of the second memory, generate the control signal to store the data of the target client in the second memory and increase a bandwidth of the first memory for data of at least one remaining client of the memory clients from which the target client is excluded.

4. The neural processing device of claim 1, wherein the control logic is further configured to:
in response to the capacity of the first memory being greater than a data capacity of the memory clients, generate the control signal to operate the bandwidth control path in a normal mode using the first memory for the data of the target client determined based on a layer type of the artificial neural network and the layer configuration.

5. The neural processing device of claim 1, wherein the control logic is further configured to:
in response to the capacity of the first memory being less than or equal to a data capacity of the memory clients, generate the control signal to operate the bandwidth control path in a boost mode using the second memory for the data of the target client determined based on a layer type of the artificial neural network and the layer configuration.

6. The neural processing device of claim 1, wherein, when the artificial neural network comprises a convolution layer and the target client is a first client of the memory clients associated with weight, the control logic is further configured to:
store the weight in the second memory based on an input channel and kernel size of the convolution layer, and increase a bandwidth of the first memory for a third client of the memory clients associated with a partial sum or an output feature map.

7. The neural processing device of claim 1, wherein, when the artificial neural network comprises a fully connected layer and the target client is a second client associated with a feature map, the control logic is further configured to:
store data of the feature map in the second memory, and increase a bandwidth of the first memory for a first client of the memory clients associated with weight.

8. The neural processing device of claim 1, wherein, when the artificial neural network comprises a convolution layer and the target client is a third client associated with a partial sum, the control logic is further configured to:
store data of the partial sum in the second memory based on a size of a feature map of the convolution layer, and increase a bandwidth of the first memory for a first client of the memory clients associated with weight.

9. The neural processing device of claim 1, wherein each of the memory clients is associated with any one of an input feature map, weight, and a partial sum or an output feature map.

10. The neural processing device of claim 1, wherein the bandwidth control path comprises twelve input ports comprising four first input ports for a first client of the memory clients associated with weight, four second input ports for a second client of the memory clients associated with an input feature map, and four third input ports for a third client of the memory clients associated with a partial sum, and nine output ports connected to the first memory.

11. The neural processing device of claim 10, wherein the four first input ports are connected to a 4-to-1 mux,
three remaining first input ports of the four first input ports from which one first input port is excluded are respectively connected to three third input ports for the third client and to three 2-to-1 muxes, and
the four second input ports for the second client associated with the input feature map are directly connected to four output ports of the nine output ports.

12. The neural processing device of claim 11, wherein, when a bandwidth of the first memory for the first client is limited, the control logic is further configured to:
sequentially provide a select signal for the 4-to-1 mux connected to the four first input ports through a round-robin method.

13. The neural processing device of claim 11, wherein, when a bandwidth of the first memory for the first client increases, the control logic is further configured to:
provide a select signal for the one first input port excluded from the connection to the three third input ports through the 2-to-1 muxes of the four first input ports.

14. An operation method of a neural processing device comprising a first memory and a second memory having a capacity less than that of the first memory, the operation method comprising:
calculating a target capacity for data of a target client of memory clients determined based on a layer configuration of an artificial neural network;
comparing the target capacity and the capacity of the second memory;
determining a target memory from between the first memory and the second memory in which the data of the target client is to be stored based on a result of the comparing; and
generating a control signal for a bandwidth control path to reconfigure a memory bandwidth for the memory clients to store the data of the target client in the target memory.

15. The operation method of claim 14, wherein the determining of the target memory comprises:
in response to the target capacity being greater than the capacity of the second memory, determining the first memory to be the target memory,
wherein the generating of the control signal comprises:
generating the control signal to store the data of the target client in the first memory and decrease a bandwidth of the first memory for data of at least one remaining client of the memory clients from which the target client is excluded.

16. The operation method of claim 14, wherein the determining of the target memory comprises:
in response to the target capacity being less than or equal to the capacity of the second memory, determining the second memory to be the target memory,
wherein the generating of the control signal comprises:

generating the control signal to store the data of the target client in the second memory and increase a bandwidth of the first memory for data of at least one remaining client of the memory clients from which the target client is excluded.

17. The operation method of claim 14, further comprising:
comparing the capacity of the first memory and a data capacity of the memory clients,
wherein the generating of the control signal comprises:
in response to the capacity of the first memory being greater than the data capacity of the memory clients as the result of the comparing, generating the control signal to operate the bandwidth control path in a normal mode using the first memory for the data of the target client determined based on a layer type of the artificial neural network and the layer configuration.

18. The operation method of claim 17, wherein the generating of the control signal further comprises:
in response to the capacity of the first memory being less than or equal to the data capacity of the memory clients, generating the control signal to operate the bandwidth control path in a boost mode using the second memory for the data of the target client determined based on the layer type and the layer configuration.

19. The operation method of claim 14, wherein, when the artificial neural network comprises a convolution layer and the target client is a first client associated with weight, the generating of the control signal comprises:
storing the weight in the second memory based on an input channel and kernel size of the convolution layer; and
increasing a bandwidth of the first memory for a third client of the memory clients associated with a partial sum or an output feature map.

20. The operation method of claim 14, wherein, when the artificial neural network comprises a fully connected layer and the target client is a second client associated with a feature map, the generating of the control signal comprises:
storing data of the feature map in the second memory; and
increasing a bandwidth of the first memory for a first client of the memory clients associated with weight.

21. The operation method of claim 14, wherein, when the artificial neural network comprises a convolution layer and the target client is a third client associated with a partial sum, the generating of the control signal comprises:
storing data of the partial sum in the second memory based on a size of a feature map of the convolution layer; and
increasing a bandwidth of the first memory for a first client of the memory clients associated with weight.

22. The operation method of claim 14, wherein each of the memory clients is associated with any one of an input feature map, weight, and a partial sum or an output feature map.

23. A non-transitory computer-readable storage medium storing instructions that, when executed by a processor, cause the processor to perform the operation method of claim 14.

24. A neural processing device comprising:
a first memory bank;
a second memory bank having a capacity less than a capacity of the first memory;
a bandwidth control path configured to reconfigure a memory bandwidth for memory clients to use any one of the first memory bank and the second memory bank based on a control signal; and
a control logic configured to
calculate a target capacity for data of a target client of the memory clients determined based on a layer configuration of an artificial neural network,
compare the target capacity and the capacity of the second memory bank, and
in response to the target capacity is less than or equal to the capacity of the second memory bank, generate the control signal to store the data of the target client in the second memory bank and increase a bandwidth of the first memory bank for data of at least one remaining client of the memory clients from which the target client is excluded.

25. The neural processing device of claim 24, wherein the control logic is further configured to:
in response to the target capacity being greater than the capacity of the second memory bank, generate the control signal to store the data of the target client in the first memory bank and decrease a bandwidth of the first memory bank for data of at least one remaining client of the memory clients from which the target client is excluded.

26. The neural processing device of claim 25, wherein, when the artificial neural network comprises a convolution layer and the target client is a first client of the memory clients associated with weight, the control logic is further configured to:
store the weight in the second memory based on an input channel and kernel size of the convolution layer, and
increase a bandwidth of the first memory for a third client of the memory clients associated with a partial sum or an output feature map.

27. The neural processing device of claim 25, wherein, when the artificial neural network comprises a fully connected layer and the target client is a second client associated with a feature map, the control logic is further configured to:
store data of the feature map in the second memory, and
increase a bandwidth of the first memory for a first client of the memory clients associated with weight.

28. The neural processing device of claim 25, wherein, when the artificial neural network comprises a convolution layer and the target client is a third client associated with a partial sum, the control logic is further configured to:
store data of the partial sum in the second memory based on a size of a feature map of the convolution layer, and
increase a bandwidth of the first memory for a first client of the memory clients associated with weight.

* * * * *